May 4, 1937.

H. L. SPENCE 2,079,088

DRAFT GEAR

Filed May 18, 1935

INVENTOR:
Hubert L. Spence
BY Clarence D Kerr
his ATTORNEY.

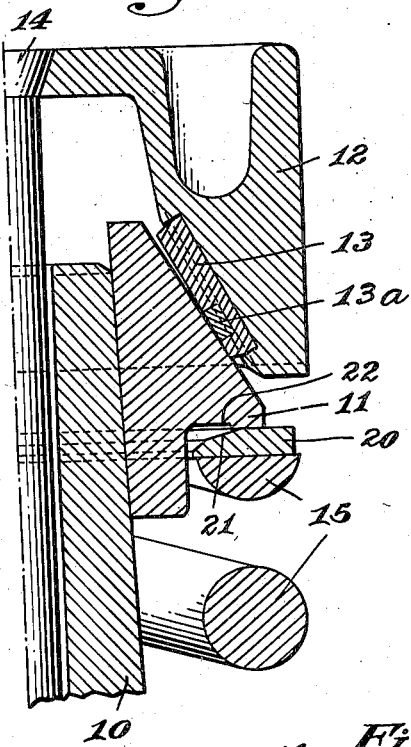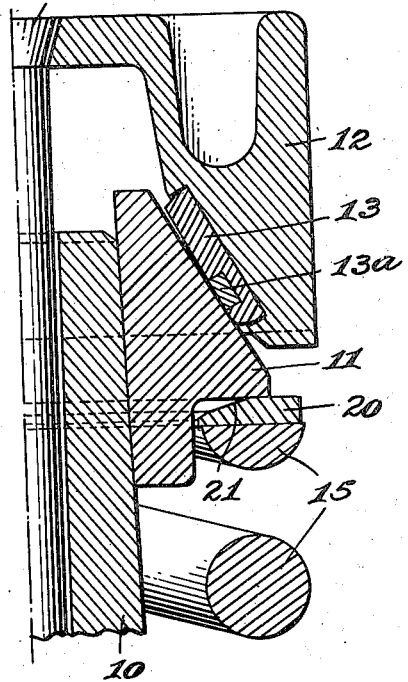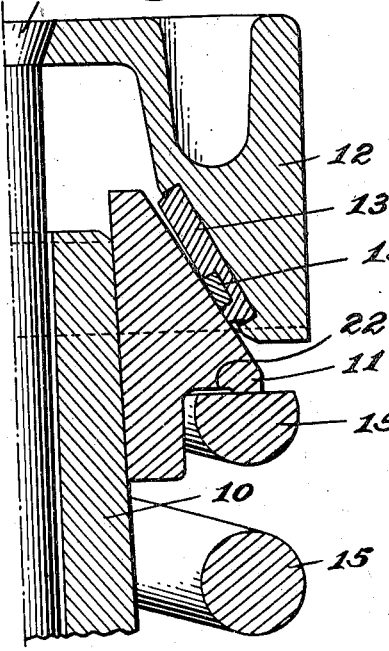

Patented May 4, 1937

2,079,088

UNITED STATES PATENT OFFICE 2,079,088

DRAFT GEAR

Hubert L. Spence, East Cleveland, Ohio, assignor to National Malleable and Steel Castings Company, Cleveland, Ohio, a corporation of Ohio Application May 18, 1935, Serial No. 22,190

10 Claims. (Cl. 213—36)

My invention relates to a light weight, inexpensive, draft gear for use in railway rolling stock, and which may be used in new equipment, or to replace defective gears in old equipment.

In order for draft gears to be eligible for use in interchange service they must first pass a test which is known as the drop hammer test. That is, they are subjected to repeated blows under a drop hammer, thus producing conditions in excess of those encountered in ordinary use. A good deal of frictional heat is developed between the members and if friction members persistently stick together without releasing properly the gear is promptly rejected.

I have designed a new draft gear which has all the advantages of being light in weight and, at the same time, is adapted to stand up under the repeated blows of the drop hammer in testing. By my improved construction, a gear is provided that is brought to a high frictional capacity after only a few blows from the drop hammer, while providing immediate and perfect release of the friction members after each blow. Three embodiments of my invention have been illustrated in the drawings, in which:

Figure 5 is a detailed sectional view showing a portion of the friction member, one shoe, the wedge, and related parts of an embodiment of my invention.

Figure 6 is a view similar to Figure 5, of another and preferred embodiment thereof and Figure 7 is a view similar to Figure 5 showing a still further embodiment thereof.

Figure 1:
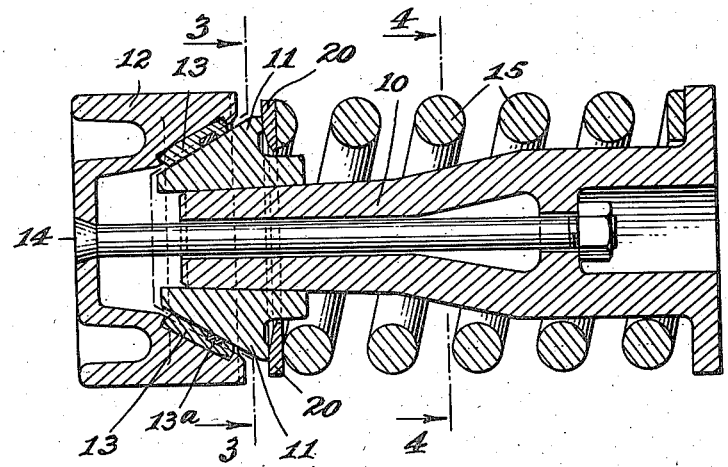
Figure 1 shows a vertical section of a draft gear in its assembled position.
Figure 2:
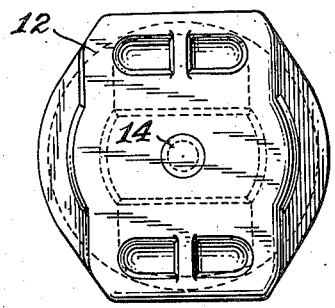
Figure 2 is an end view of my improved gear, looking at Figure 1 from the left hand side.
Figure 3:
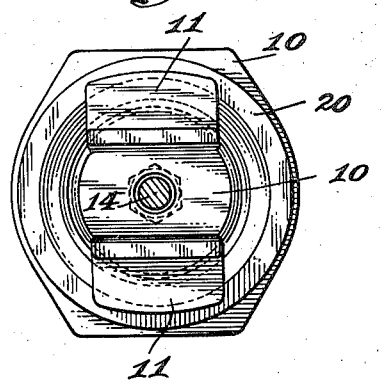
Figure 3 is an end view in section with the wedge removed and taken on a line 3—3 of Figure 1.
Figure 4:
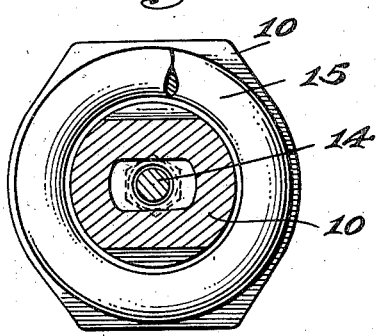
Figure 4 is a sectional view on the line 4—4 of Figure 1.

Referring more particularly to the drawings, in which like reference numerals denote similar parts, numeral 10 indicates a friction member carrying friction shoes 11. Wedge 12, provided with suitable pads of bearing metal 13, is adapted to engage the friction shoes and is connected to the friction member 10 by means of the bolt 14, which retains the parts in properly assembled relation. A spring 15, interposed between the friction member 10 and shoes 11, resiliently opposes movement of the friction member and wedge toward each other.

Bearing metal inserts 13 may also be provided with suitable pads of lubricating material 13a, such as graphite. Friction shoes 11 are held against the wedge in normal position by said coil spring 15, one end of which is seated against the heel portion of the shoes in a manner which is described below.

Referring more particularly to Figures 5, 6 and 7, the wedges and their respective pads are preferably cut at such an angle that the shoes 11 contact the pads only at small areas near the spring. In other words, the angle of the wedge with respect to the friction member is slightly more acute than the angle of the shoe with respect to said friction member. This necessarily concentrates the bearing surface between the shoe and the wedge at a small high pressure area definitely located near the back end or what is called the heel of the shoe.

In such a device as a draft gear, it is commercially impossible to fit the co-operating surfaces of wedge and shoes with sufficient accuracy to insure a uniform bearing over the entire contacting wedging surfaces, when the parts are assembled and initially compressed. I have found that consistent uniform results are obtained when these wedging surfaces are so formed that the wedging contact is initially confined to a relatively small area definitely located near the heel end of the friction shoes as distinguished from the toe end thereof. It is for this reason that I have provided the bearing surfaces between the wedge and shoes with high pressure areas of definite location and arranged to allow the shoe bearing surfaces to become properly adapted and fitted to the wedge during the breaking-in period. Such a construction is found to assist materially in providing a uniform high frictional capacity very shortly after the gear is placed under the drop hammer. During this breaking-in period the friction surfaces of the shoes and friction members become roughened or scored.

To overcome the sticking tendency caused by the roughened surfaces, an important feature of my invention resides in seating the spring at a point on the shoes as far removed from the friction member as possible. To obtain the best releasing action, the spring or spring seat preferably acts on an area of the heels of the shoes which is at least as far removed from the friction member as the high pressure bearing area between the wedge and bearing surfaces of the shoes. By such a construction the spring tends to peel the friction shoes away from the friction member after each blow, rather than producing a shearing action between these members. In other words, by this construction the action of the springs upon the shoes is converted from the shearing action, which results when the spring pressure is transmitted to the shoes relatively near the friction member as is ordinarily the case, to an action wherein the spring tends to lift the heels away from the friction member and thus to peel the shoe away from said member. The exertion of spring pressure nearer the friction member is not serious in normal operation of the gear following the breaking-in period, but when the gear is subjected to repeated blows in testing by the drop hammer, the engaging surfaces of the friction member and shoes become heated and tend to seize and bind until the gear has been worked sufficiently to wear down the high spots and to seat the parts properly. These difficulties are completely obviated by my invention, wherein the first result produced when the releasing action of the spring comes into play is to lift, or tend to lift, the heel portion of the shoe away from the friction member. A quick and positive release of the parts is thus provided after each blow of the drop hammer.

In the construction, shown in Figure 5, an annular spring seat, or washer like member 20, is placed between the heel of the friction shoe and the spring. This washer is preferably cut away, or beveled, on its inner face as at 21 and the heel of the shoe, instead of being perfectly flat, is also cut away at a corresponding portion as at 22. Considerable wear, of course, takes place between the spring seat and the heel of the shoe, but this does not affect the operation of my device because by the time that the heel of the shoe is perfectly flat and the spring acts to push the friction shoe along a line substantially parallel with the friction member, the parts have all become broken in, or fitted to each other, and special means providing quick release of the surfaces in contact is no longer necessary. It is also apparent, of course, that the bearing insert on the wedge will become fairly rapidly worn at the high pressure area thereof, or squashed down, so that the full bearing surface eventually comes into play, but at this place also, the full bearing surfaces do not cooperate with each other until after parts have been sufficiently worn to be thoroughly broken in and provide a quick release.

The embodiments shown in Figures 6 and 7 are similar to the device in Figure 5. In Figure 6 a similar washer-like member 20 is provided with a similar cut away portion 21, but the heel portion of the shoe is perfectly flat. Such a construction obviates the necessity of making the shoes with cut away portions and is preferred by reason of its simplicity of construction and ease of manufacture. In the embodiment shown in Figure 7 one end of the spring 15 is seated directly against the heel of the shoe, which has the inner section cut away as at 22, similar to the construction shown in Figure 5. Experience has proved that this cut away portion, or gap, between the inner portion of the heel and the spring, or spring seat, may be initially as small as $\frac{1}{32}$ of an inch, providing just sufficient room to change the direction of application of pressure by the spring on the shoe, and to secure a lifting action. By the time even such a small raised portion is worn down flat, the bearing surfaces of the gear are adequately broken in.

By this simple light weight construction I provide a gear which is adaptable for use in both new and old equipment, and which is very inexpensive to make because of its simplicity. Any question of beveling the end of the spring, which is a very difficult operation, if not impossible, is eliminated. Uniform frictional capacity during the breaking-in period is secured by reason of the concentrated, definitely located bearing areas between the wedging surfaces, and a quick positive release is provided between the friction member and the shoes by reason of the tendency of the spring to rotate the shoe about its toe. This construction effectively enables a gear to develop high frictional capacity promptly under the drop hammer test while the bearing surfaces are wearing into place, so that a smooth acting friction device of normal capacity and sure release is available even during the breaking-in period, whereas without my improvements the capacity would be low and erratic and the gear would frequently stick.

While I have shown three simple ways of allowing the spring to act on the friction shoes, any other construction may be employed which provides the lifting or peeling movement to the friction shoes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In shock absorbing apparatus, a friction member, friction shoes engaging said friction member, a wedge having bearing surfaces only a portion of which upon initial assembly of the apparatus engage outer bearing surfaces of said shoes proximate the heels of said shoes, and a spring holding said shoes and said wedge in engagement with each other and adapted to act only on portions of the heels of said shoes remote from said friction member.

2. In shock absorbing apparatus, a friction member, friction shoes engaging said friction member, a wedge having bearing surfaces only a portion of which upon initial assembly of the apparatus engage outer bearing surfaces of said shoes proximate the heels of said shoes, a spring holding said shoes and said wedge in engagement with each other by acting on the heel portions of said shoes, and a spring seat between said heel portions and said spring contacting only portions of said heels remote from said friction member.

3. In shock absorbing apparatus, a friction member, friction shoes engaging said friction member, a wedge having bearing surfaces only a portion of which upon initial assembly of the apparatus engage outer bearing surfaces of said shoes proximate the heels of said shoes, and a spring holding said shoes and said wedge in engagement with each other and adapted to act only on the heel portions of said shoes, said heel portions being cut away at points thereof nearest said friction member so that said spring will act only on points remote from said friction member.

4. In shock absorbing apparatus, a friction member, friction shoes engaging said friction member, a wedge having bearing surfaces only a portion of which engage outer bearing surfaces of said shoes proximate the heels of said shoes when said friction shoes are seated against said member, and a spring holding said shoes and said wedge in engagement with each other and adapted to act only on portions of the heels of said shoes remote from said friction member, said portions of the heels of said shoes being located at least as far from said friction member as the area of contact between the bearing surfaces of the wedge and the bearing surfaces of the friction shoes.

5. In shock absorbing apparatus, a friction member, friction shoes engaging said friction member, a wedge member engaging outer bearing surfaces of said friction shoes, the bearing surface of said wedge member forming a smaller angle with the friction member than is formed by the outer bearing surfaces of the friction shoes when said friction shoes are seated against said member to provide a high point of pressure on said friction shoe remote from said friction member, and a spring acting on the heel portions of said friction shoes at points thereon removed from said friction member.

6. In shock absorbing apparatus, a friction member, friction shoes engaging the friction member, a spring, a wedge having surfaces engaging said shoes for moving them against the resistance of the spring, the wedge and shoes being so arranged as to initially limit the engagement therebetween to areas comprising portions of the wedge surfaces remote from the friction member when said shoes are in frictional engagement with said friction member, and said shoes being also arranged to receive the pressure from said spring over an area removed from the friction member.

7. In shock absorbing apparatus, a friction member, wedge and shoes, a spring resisting inward movement of said shoes, said wedge and shoes being provided with cooperating wedging surfaces of substantial extent and being constructed and arranged so that upon initial assembly of the parts, and with the shoes in frictional engagement with said friction member, the extent of said wedging engagement is limited to areas comprising portions of the wedge surfaces remote from said friction member, said shoes being arranged to receive pressure from said spring over an area substantially in axial alinement with said initial wedging contact areas.

8. In shock absorbing apparatus, a friction member, friction shoes engaging said member, a wedge engaging said shoes, and spring means for maintaining the shoes in contact with the wedge, the area of engagement between said wedge and shoes being arranged to initially provide clearance between said wedge and shoes except over a limited area farthest removed from the friction member when the shoes are in substantially full frictional engagement with the friction member, and the force of said spring means being transmitted to said shoes only over an area spaced from said friction member.

9. In shock absorbing apparatus, a friction member, friction shoes engaging said member, a wedge having surfaces engaging said shoes, and spring means for maintaining the shoes in contact with the wedge, the area of engagement between said wedge and shoes being limited initially to a portion of said surfaces remote from the friction member when the shoes are in substantially full frictional engagement with the friction member, the force of said spring means being transmitted to said shoes only over an area spaced from said friction member a distance at least as great as the distance of said area of engagement from said member.

10. Shock absorbing apparatus comprising a friction member, friction shoes engaging said member, a wedge having metal inserts engaging said shoes, and a spring surrounding said friction member for maintaining the shoes in contact with said inserts, said shoes and wedge being so constructed and arranged that only portions of said inserts remote from said member are in contact with the shoes when the gear is new and the shoes thereof are in full frictional engagement with said member, said spring acting on areas of said shoes spaced from said member a distance at least as great as the distance of the area of contact between the inserts and shoes from said member.

HUBERT L. SPENCE.